United States Patent
Yang

(10) Patent No.: US 9,838,580 B2
(45) Date of Patent: Dec. 5, 2017

(54) OPTICALLY CONNECTABLE CLOSED-CIRCUIT TELEVISION CAMERA APPARATUS USING PASSIVE OPTICAL DEVICES AND CLOSED-CIRCUIT TELEVISION SYSTEM

(71) Applicant: HYUNDAI INFRACORE, Inc., Seoul (KR)

(72) Inventor: Jong Seog Yang, Seoul (KR)

(73) Assignee: HYUNDAI INFRACORE, INC., Seoul (KR)

( * ) Notice: Subject to any disclaimer, the term of this patent is extended or adjusted under 35 U.S.C. 154(b) by 203 days.

(21) Appl. No.: 14/884,848

(22) Filed: Oct. 16, 2015

(65) Prior Publication Data

US 2017/0111556 A1    Apr. 20, 2017

(51) Int. Cl.
*G02B 6/28* (2006.01)
*H04N 5/225* (2006.01)
(Continued)

(52) U.S. Cl.
CPC .......... *H04N 5/2254* (2013.01); *G02B 6/125* (2013.01); *G02B 6/1228* (2013.01); *G02B 6/28* (2013.01);
(Continued)

(58) Field of Classification Search
CPC . B21B 27/06; B21B 3/00; B21J 1/006; C22C 1/002; C22C 33/003; C22C 45/003; C22C 45/005; C22C 45/02; C22C 45/04; C22C 45/10; G02B 2006/12147; G02B 2006/1215; G02B 6/1228; G02B 6/125; G02B 6/28; G06K 9/00771; H04N 5/2253
(Continued)

(56) References Cited

U.S. PATENT DOCUMENTS 6,122,419 A * 9/2000 Kurokawa ......... G02B 6/12007
                                                     372/77
6,456,760 B1 * 9/2002 Kurokawa ......... G02B 6/12007
                                                     359/333
(Continued)

OTHER PUBLICATIONS

Liu et al, Real-time video surveillance for large scenes, 2011.*

*Primary Examiner* — Shan Elahi
(74) *Attorney, Agent, or Firm* — Lex IP Meister, PLLC

(57) ABSTRACT

An optical connectable closed-circuit television (CCTV) camera apparatus and a CCTV system are disclosed herein. The CCTV camera apparatus includes an optical splitter, an optical combiner, an optical reception unit, an optical transmission unit, a communication control unit, a camera function control unit, and an image processing unit. The optical splitter splits a downstream optical signal into a branch optical signal and a pass-through optical signal. The optical combiner optically combines an outgoing video optical signal and an upstream optical signal. The optical reception unit receives the branch optical signal, and converts the branch optical signal. The optical transmission unit receives and converts an outgoing video electric signal. The communication control unit interprets an address, outputs a control command or data or discards the incoming electric signal, and generates the outgoing video electric signal. The camera function control unit controls various functions. The image processing unit generates video data.

10 Claims, 2 Drawing Sheets

(51) Int. Cl.
*G02B 6/125* (2006.01)
*G02B 6/122* (2006.01)
*H04N 5/232* (2006.01)
*G06K 9/00* (2006.01)
*G02B 6/12* (2006.01)

(52) U.S. Cl.
CPC ....... *G06K 9/00771* (2013.01); *H04N 5/2253* (2013.01); *H04N 5/23206* (2013.01); *G02B 2006/1215* (2013.01); *G02B 2006/12147* (2013.01)

(58) Field of Classification Search
USPC ........................................................ 348/159
See application file for complete search history.

(56) References Cited

U.S. PATENT DOCUMENTS

| | | | | |
|---|---|---|---|---|
| 6,556,322 | B1 * | 4/2003 | Desurvire | H04J 14/083 398/102 |
| 9,312,953 | B2 * | 4/2016 | Soto | H04B 10/0775 |
| 9,608,758 | B1 * | 3/2017 | Zhao | H04J 14/0205 |
| 2007/0194915 | A1 * | 8/2007 | Chun | G08B 13/124 340/541 |
| 2008/0130660 | A1 * | 6/2008 | Ros-Giralt | H04L 47/10 370/400 |
| 2008/0288986 | A1 * | 11/2008 | Foster | G08B 13/19656 725/62 |
| 2011/0211827 | A1 * | 9/2011 | Soto | H04B 10/071 398/25 |
| 2013/0330076 | A1 * | 12/2013 | Liboiron-Ladouceur | H04J 14/0223 398/47 |
| 2014/0018059 | A1 * | 1/2014 | Noonan | H04W 48/04 455/419 |
| 2014/0341562 | A1 * | 11/2014 | Sabat, Jr. | H04B 10/1127 398/5 |
| 2015/0356285 | A1 * | 12/2015 | Glaser | G06F 21/32 726/7 |
| 2017/0155461 | A1 * | 6/2017 | Zhao | H04J 14/0223 |

* cited by examiner

OPTICALLY CONNECTABLE CLOSED-CIRCUIT TELEVISION CAMERA APPARATUS USING PASSIVE OPTICAL DEVICES AND CLOSED-CIRCUIT TELEVISION SYSTEM

CROSS-REFERENCE TO RELATED APPLICATIONS

This application claims the benefit under 35 USC 119(a) of Korean Patent Application No. 10-2014-0045850 filed on Apr. 17, 2014 in the Korean Intellectual Property Office, the entire disclosure of which is incorporated herein by reference for all purposes.

BACKGROUND

Field

The present invention relates to a closed-circuit television (CCTV) camera apparatus.

Description of Related Art

Conventional security camera systems are analog-based systems that transmit analog video signals from cameras to a control server via a wide bandwidth coaxial cable and record the analog video signals at the control server, or digital-based systems that transmit digital videos from digital cameras, compressed using digital compression logic embedded in the digital cameras, to a control server over a TCP/IP-based network and store the digital videos at the control server.

To utilize TCP/IP network communication commonly used in digital-based systems, it is necessary to assign IP addresses to respective digital camera apparatuses and to connect between the digital camera apparatuses and a control server or connect between the digital camera apparatuses and a hub or a switch by UTP cables or optical cables.

Generally, the cables for a security camera system must be well concealed or protected to prevent the cables from being easily exposed or damaged. Since cables are usually not able to be installed directly via the shortest distance but need to make a detour around obstacles or power lines or to be laid along various conduits, the length of cables easily exceeds. Although UTP cable ensures a considerable transmission distance, the UTP cable may be more affected by environment and the transmission speed thereof may be further decreased as the cable elongates. Although optical cable has advantage over UTP cable in terms of transmission speed, optical cable has no particular advantage over UTP cable in view of the number of cables needed or the length thereof. Furthermore, because conduit has limited size and needs for using conduits, such as for telecommunication cable, are great, only limited number of cables may be accommodated in conduits.

Furthermore, adding CCTV camera apparatuses to a conventional system, changing the location of a previously installed CCTV camera apparatus or repairing the system may require cabling jobs to be done all over to a control server or the nearest hub or switch every time.

Accordingly, there is very strong possibility that jobs for expanding, changing, repairing or improving a security camera system additionally entail complicated and difficult cabling and interior tasks, not just simply finishing with newly installing or replacing CCTV camera apparatuses.

As described above, in the conventional IP-based security camera systems, cabling jobs using hub and switch may cause various more or less problems whenever installing, repairing, expanding, changing or modifying the system is done.

SUMMARY

At least one embodiment of the present invention is directed to the provision of an optical connectable CCTV camera apparatus using passive optical devices and a CCTV system.

At least one embodiment of the present invention is directed to the provision of an optical connectable CCTV camera apparatus using passive optical devices and a CCTV system, which have simple structures and are inexpensive.

In accordance with an aspect of the present invention, there is provided an optical connectable CCTV camera apparatus, including an optical splitter configured to split an optically received downstream optical signal into a branch optical signal and a pass-through optical signal, an optical combiner configured to optically combine an outgoing video optical signal, generated by the optical connectable CCTV camera apparatus, and an upstream optical signal, optically received via another optical connectable CCTV camera apparatus, into a combined upstream optical signal, an optical reception unit configured to receive the branch optical signal, to convert the branch optical signal into an incoming electric signal, and to transfer the incoming electric signal to a communication control unit, an optical transmission unit configured to receive an outgoing video electric signal from the communication control unit, and to convert the outgoing video electric signal into the outgoing video optical signal, the communication control unit configured to extract an address from the incoming electric signal, to output a control command or data, extracted from the incoming electric signal local, to a camera function control unit depending on the address to discard the incoming electric signal depending on the address, to generate the outgoing video electric signal based on video data transferred from an image processing unit, and to output the generated outgoing video electric signal to the optical transmission unit in accordance with a transmission permission-related control command among the control command, the camera function control unit configured to control a lens, an image sensor device, storage, and image processing and encoding functions in accordance with a control command transferred from the communication control unit, and the image processing unit configured to, under the control of the camera function control unit, generate the video data from video acquired by the image sensor device and transfer the video data to the communication control unit.

The optical splitter may include a downstream optical signal waveguide configured to receive the downstream optical signal, a splitting unit configured to optically split the downstream optical signal, guided via the downstream optical signal waveguide, into the branch optical signal and the pass-through optical signal, a branch optical signal waveguide configured to output the branch optical signal to the optical reception unit, and a pass-through optical signal waveguide configured to externally output the pass-through optical signal from the splitting unit.

The optical combiner may include an upstream optical signal waveguide configured to receive an upstream optical signal transferred via another optical connectable CCTV camera apparatus, an outgoing optical signal waveguide configured to receive the outgoing video optical signal from the optical transmission unit, a combination unit configured to optically combine the upstream optical signal, guided via the upstream optical signal waveguide, and the outgoing video optical signal into a combined upstream optical signal, and a combined optical signal waveguide configured to externally output the combined upstream optical signal.

The optical splitter or the optical combiner may be implemented as a Planar Lightwave Circuit (PLC)-based or Fused Biconic Taper (FBT)-based passive optical device.

The optical splitter or the optical combiner may be implemented as a Y-shaped waveguide or a directional coupling combiner.

The downstream optical signal may be generated by at least one master device, and be applied to the optical splitter of a corresponding optical connectable CCTV camera apparatus directly or via the optical splitter of at least one other optical connectable CCTV camera apparatus, and the combined upstream optical signal may be transmitted to at least one master device directly or via the optical combiner of the at least one additional optical connectable CCTV camera apparatus.

In accordance with an aspect of the present invention, there is provided an optical connectable CCTV television system, including a master control server configured to operate as a master of a multi-drop network, and slave optical connectable CCTV camera apparatuses connected to the master control server in a multi-drop configuration via a downstream optical cable and an upstream optical cable, wherein each of the slave optical connectable CCTV camera apparatuses comprises an optical splitter configured to split a downstream optical signal, optically received via the downstream optical cable, into a branch optical signal and a pass-through optical signal, an optical combiner configured to optically combine an outgoing optical signal, generated by the slave optical connectable CCTV camera apparatus, and an upstream optical signal, optically received from another slave optical connectable CCTV camera apparatus via the upstream optical cable, into a combined upstream optical signal, an optical reception unit configured to receive the branch optical signal, to convert the branch optical signal into an incoming electric signal, and to transfer the incoming electric signal to a communication control unit, an optical transmission unit configured to receive an outgoing video electric signal from the communication control unit, and to convert the outgoing video electric signal into the outgoing optical signal, and the communication control unit configured to extract an address included in the incoming electric signal, to output a control command or data extracted from the incoming electric signal via a local communication interface depending on the address, to discard the incoming electric signal depending on the address, to generate the outgoing video electric signal based on video data transferred via the local communication interface, and to output the generated outgoing video electric signal to the optical transmission unit.

The master control server and the slave optical connectable CCTV camera apparatuses may operate in a time synchronized state in accordance with a time-division method, in which any one of the slave optical connectable CCTV camera apparatuses outputs an upstream optical signal designated to the master control server via the upstream optical cable in each time span in accordance with a predetermined time-division algorithm.

The master control server and the slave optical connectable CCTV camera apparatuses may operate in accordance with a polling method, in which the master control server calls a specific slave optical connectable CCTV camera apparatus in accordance with a predetermined polling algorithm and the called specific slave optical connectable CCTV camera apparatus outputs an upstream optical signal to the master control server via the upstream optical cable.

The master control server and the slave optical connectable CCTV camera apparatuses may operate in accordance with an interrupt method, in which, when a specific slave optical connectable CCTV camera apparatus in which an event has occurred generates an interrupt and optically outputs the generated interrupt to the master control server, the master control server receives an upstream optical signal corresponding to the interrupt, sends a downstream optical signal, including data transmission permission, to the specific slave optical connectable CCTV camera apparatus that has generated the interrupt, and the specific slave optical connectable CCTV camera apparatus that has received the data transmission permission outputs an upstream optical signal to the master control server via the upstream optical cable.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
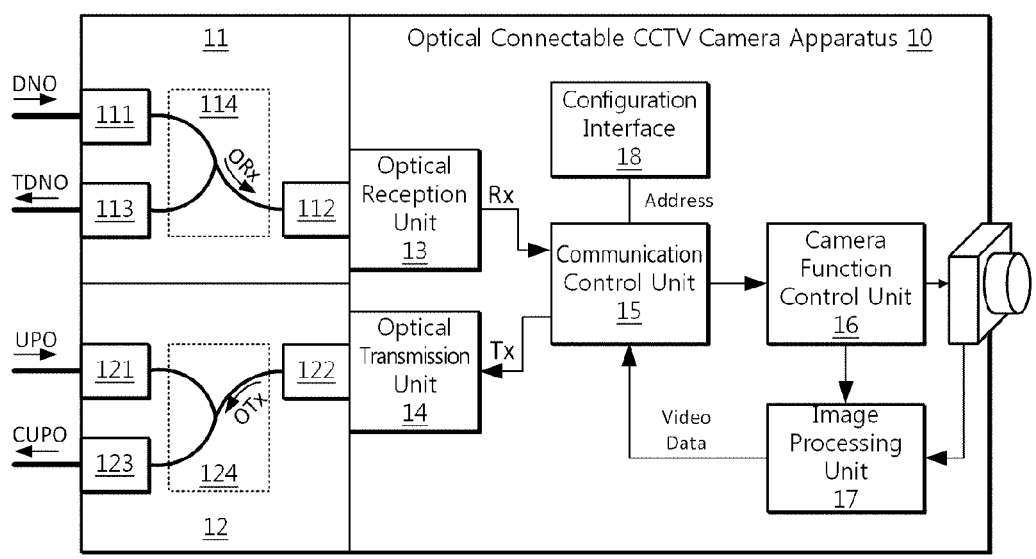
FIG. 1 is a conceptual diagram illustrating an optical connectable CCTV camera apparatus using passive optical devices according to an embodiment of the present invention.

With regard to embodiments of the present invention disclosed herein, specific structural and functional descriptions are given merely for the purpose of illustrating the embodiments of the present invention. Embodiments of the present invention may be practiced in various forms, and the present invention should not be construed as being limited to the embodiments disclosed herein.

Embodiments of the present invention will be described in detail below with reference to the accompanying drawings. The same reference numerals will be used to denote the same components throughout the accompanying drawings, and redundant descriptions of the same components will be omitted.

FIG. 1 is a conceptual diagram illustrating an optical connectable CCTV camera apparatus 10 using passive optical devices according to an embodiment of the present invention.

Referring to FIG. 1, the optical connectable CCTV camera apparatus 10 may include an optical splitter 11, an optical combiner 12, an optical reception unit 13, an optical transmission unit 14, a communication control unit 15, a camera function control unit 16, an image processing unit 17, and a setting interface 18.

The optical connectable CCTV camera apparatus 10 may optically receive a downstream optical signal including a control command intended to control the camera function of the CCTV camera apparatus 10 from at least one control server directly or via at least one additional optical connectable CCTV camera apparatus, or may optically transmit an outgoing video optical signal, generated by the CCTV camera apparatus 10, or an upstream optical signal, optically received via another optical connectable CCTV camera apparatus, to at least one master device directly or via at least one additional optical connectable CCTV camera apparatus.

Furthermore, the optical connectable CCTV camera apparatus 10 may relay optical signals between a control server functioning as at least one master device and other optical connectable CCTV camera apparatuses functioning as a plurality of slaves.

More specifically, the optical splitter 11 and the optical combiner 12 are Planar Lightwave Circuit (PLC)-based or Fused Biconic Taper (FBT)-based passive optical devices.

The optical splitter 11 splits a downstream optical signal DNO, optically received directly from control server (not shown) functioning as at least one master device or via at least one additional optical connectable CCTV camera apparatus (not shown), into a branch optical signal ORx and a pass-through optical signal TDNO.

More specifically, the optical splitter 11 receives a downstream optical signal DNO at a downstream optical signal waveguide 111, splits the downstream optical signal DNO into the branch optical signal ORx and the pass-through optical signal TDNO at a splitting unit 114, outputs the branch optical signal ORx at a branch optical signal waveguide 112, and outputs the pass-through optical signal TDNO at a pass-through optical signal waveguide 113.

The pass-through optical signal TDNO functions as a downstream optical signal for another optical connectable CCTV camera apparatus that is subsequently connected.

The optical splitter 11 may include the splitting unit 114 configured such that the core widths of two split waveguides are different, i.e., configured to be asymmetric, and may split the downstream optical signal DNO at an unbalanced split ratio in which the ratio of the intensity of the branch optical signal ORx to the intensity of the pass-through optical signal TDNO is, for example, 1:N. In this case, the split ratio may be determined to be a split ratio that is sufficient for other optical connectable CCTV camera apparatuses 10, which will receive the pass-through optical signal TDNO, to receive an optical signal having sufficient intensity.

The splitting unit 114 may be implemented as a Y-shaped waveguide or a directional coupling combiner.

The branch optical signal ORx is input to the optical reception unit 13 optically connected, preferably directly connected, to the branch optical signal waveguide 112 of the optical splitter 11, and the pass-through optical signal TDNO optically output from the pass-through optical signal waveguide 113 of the optical splitter 11.

The optical reception unit 13 receives the branch optical signal ORx from the branch optical signal waveguide 112 optically connected, preferably directly connected, to the optical reception unit 13, converts the branch optical signal ORx into an incoming electric signal Rx, and transfers the incoming electric signal Rx to the communication control unit 15.

Meanwhile, the optical combiner 12 optically combines an outgoing video optical signal OTx, generated by the optical connectable CCTV camera apparatus 10 itself, and an upstream optical signal UPO, optically received via another optical connectable CCTV camera apparatus (not shown), into a combined upstream optical signal CUPO, and may transmit the generated combined upstream optical signal CUPO to at least one master device (not shown) directly or via at least one other optical connectable CCTV camera apparatus (not shown).

More specifically, the optical combiner 12 receives the upstream optical signal UPO, transferred via another optical connectable CCTV camera apparatus, at an upstream optical signal waveguide 121, receives the outgoing video optical signal OTx at an outgoing optical signal waveguide 122, optically combines the upstream optical signal UPO and the outgoing video optical signal OTx into the combined upstream optical signal CUPO at, for example, the Y-shaped combination unit 124, and outputs the combined upstream optical signal CUPO at a combined optical signal waveguide 123.

The optical combiner 12 may include a combination unit 124 in which the core widths of two waveguides that are combined are the same, i.e., which is symmetrical.

The combination unit 124 may be implemented as a Y-shaped waveguide or a directional coupling combiner.

In an embodiment, optical connectable CCTV camera apparatuses 10 that operate as a plurality of slaves may be controlled to communicate with a control server, i.e., a master, in a non-contention manner, or exclusively, during a given period of time after being called by the master using a polling method, and thus possibility that the upstream optical signal UPO and the outgoing video optical signal OTx are simultaneously applied and optically mixed at the optical combiner 12 may be excluded.

In an embodiment, optical connectable CCTV camera apparatuses 10 that operate as a plurality of slaves may be controlled to notify a control server, i.e., a master, of the occurrence of a predetermined event when the event occurs using an interrupt method and to communicate with the master in a non-contention manner, or exclusively, for a period of time that is permitted by the master.

In this case, substantially, the term "combined upstream optical signal CUPO" is a term that is used merely to be distinguished from the upstream optical signal UPO applied to the upstream optical signal waveguide 121, rather than to refer to an optical signal in which the optical wave of the upstream optical signal UPO and the optical wave of the outgoing video optical signal OTx are mixed, and may be viewed as a term that refers to any one of the upstream optical signal UPO and the outgoing optical signal OTx that are not overlapped with each other.

The optical splitter 11 and the optical combiner 12 are passive optical devices, and thus may transfer a downstream optical signal or an upstream optical signal to another optical connectable CCTV camera apparatus or the control server even though the corresponding optical connectable CCTV camera apparatus 10 stops operation due to defective power or turning to power saving mode.

Furthermore, the optical connectable CCTV camera apparatus 10 using the optical splitter 11 and the optical combiner 12 according to the present invention rarely has time delay compared to a conventional configuration for transferring an optical signal upwardly or downwardly in a way of first converting the optical signal to an electric signal and then converting again the electric signal to another optical signal.

The optical transmission unit 14 may receive an outgoing video electric signal Tx from the communication control unit 15, may convert the outgoing video electric signal Tx into an outgoing video optical signal OTx, and may apply the outgoing video optical signal OTx to the outgoing optical signal waveguide 122 of the optical combiner 12 optically connected, preferably directly connected, to the optical transmission unit 14.

The communication control unit 15 extracts an address, a control command and data from the incoming electric signal Rx received via the optical splitter 11 and the optical reception unit 13, and, if it is determined that the interpreted address is an address corresponding to the corresponding optical connectable CCTV camera apparatus 10, outputs the control command or the data, extracted from the incoming electric signal, to the camera function control unit 16. In contrast, if the extracted address is not related to the corresponding optical connectable CCTV camera apparatus 10, the communication control unit 15 disregards and discards the received command and the data.

The communication control unit 15 may generate an outgoing video electric signal Tx based on video data generated by the image processing unit 17, and may output the outgoing video electric signal Tx to the optical transmission unit 14 in accordance with the transmission permission-related control command among the control command extracted from the incoming electric signal.

In an embodiment, the communication control unit 15 may be designed to support a full-duplex/half-duplex communication method or a synchronous/asynchronous communication method as required in order to have, for example, compatibility with a conventional multi-drop EIA-485/422 network.

The camera function control unit 16 may control a lens, an image sensor device, storage, and functions, such as image processing, object recognition, calibration, encoding, etc., provided in the optical connectable CCTV camera apparatus 10, in accordance with control commands transferred from the communication control unit 15 or in accordance with self determination.

The image processing unit 17 generates video data from video acquired by an image sensor device and then transfers the video data to the communication control unit 15 under the control of the camera function control unit 16.

The configuration interface 18 may be implemented using a dual in-line package (DIP) switch or the like. A user may set an address or the like, to which the communication control unit 15 will refer, via the configuration interface 18.

Figure 2:
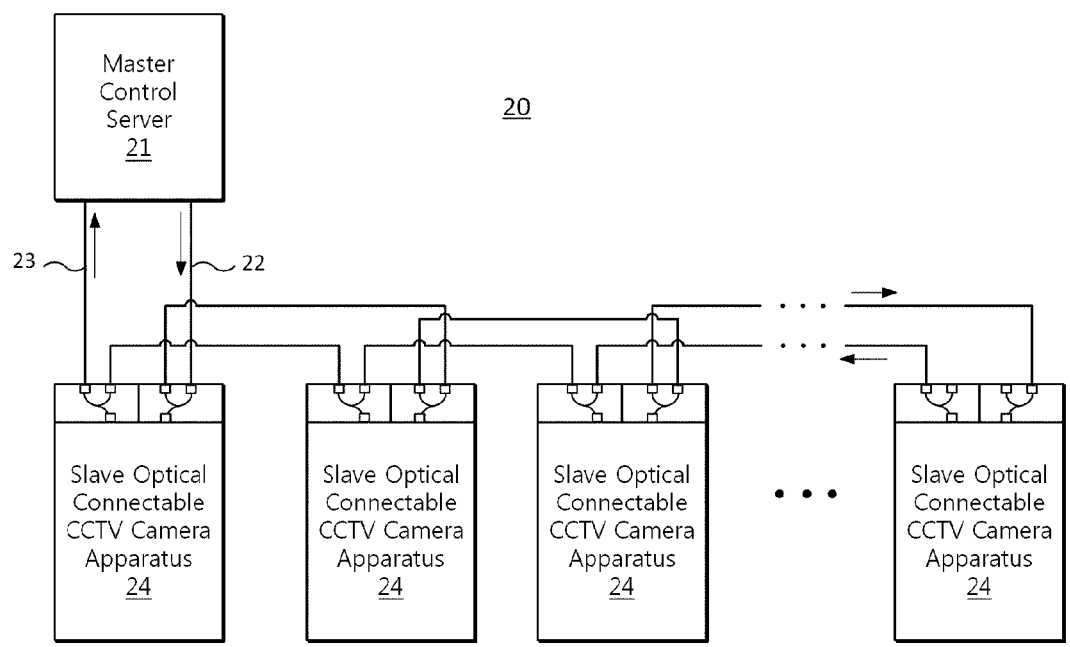
FIG. 2 is a diagram illustrating an optical connectable CCTV system including a plurality of optical connectable CCTV camera apparatuses using passive optical devices according to embodiments of the present invention.

FIG. 2 is a diagram illustrating an optical connectable CCTV system including a plurality of optical connectable CCTV camera apparatuses using passive optical devices according to embodiments of the present invention.

The optical connectable CCTV television system 20 may include a master control server 21, a downstream optical cable 22, an upstream optical cable 23, and slave optical connectable CCTV camera apparatuses 24 connected in series.

The slave optical connectable CCTV camera apparatuses 24 may be connected using a full-duplex/half-duplex type multi-drop method.

A downstream optical signal output to the slave optical connectable CCTV camera apparatus 24 having a specific address by the master control server 21 is applied to the downstream optical signal waveguides of the optical splitters of the slave optical connectable CCTV camera apparatuses 24 along the downstream optical cable 22.

Each of the slave optical connectable CCTV camera apparatuses 24 extracts an address from an incoming electric signal obtained by electrically converting a branch optical signal split off from a downstream optical signal, and processes a control command or data included in the incoming electric signal if the extracted address is an address corresponding to itself, and discards the incoming electric signal if not.

Furthermore, an upstream optical signal output by each of the slave optical connectable CCTV camera apparatuses 24 is applied to the upstream optical signal waveguides of the optical combiners of the slave optical connectable CCTV camera apparatuses 24 along a path up to the master control server 21 via the upstream optical cable 23.

In this case, the upstream optical signal is output to the upstream optical cable 23 via the combined output waveguides of the optical combiners immediately right after the upstream optical signal is applied to the upstream optical signal waveguides of the optical combiners of the slave optical connectable CCTV camera apparatuses 24. Accordingly, there is no processing operation that is particularly performed on the upstream optical signal by the slave optical connectable CCTV camera apparatuses 24.

Meanwhile, since the slave optical connectable CCTV camera apparatuses 24 may not become aware of the presence of an upstream optical signal that passes therethrough, the slave optical connectable CCTV camera apparatuses 24 may not adopt a contention method but may use a non-contention method, such as a time-division communication method, a polling method or an interrupt method, as a media access control (MAC) methods.

In an embodiment, to prevent cross-talking between an upstream optical signal and an outgoing video optical signal, using a time-division communication method, any one slave optical connectable CCTV camera apparatus 24 may output video data to the master control server 21 as an upstream optical signal in each time span in accordance with a predetermined time-division algorithm while the master control server 21 and the slave optical connectable CCTV camera apparatuses 24 are all time-synchronized.

In an embodiment, to prevent cross-talking between an upstream optical signal and an outgoing video optical signal, using a polling method, the master control server 21 may call a specific slave optical connectable CCTV camera apparatus 24 in accordance with a predetermined time-division algorithm, and a called specific slave optical connectable CCTV camera apparatus 24 may output video data as an upstream optical signal.

In another embodiment, in accordance with an interrupt method, a specific slave optical connectable CCTV camera apparatus 24 in which an event has occurred may generate an interrupt, and may optically output the generated interrupt. For example, an interrupt may occur in a case where the shape of a human is detected within a limited area, abnormal behavior is observed within the crowd, or a problem with a camera function occurs.

In this case, the master control server 21 may receive an upstream optical signal corresponding to the interrupt, and may send a downstream optical signal, including data transmission permission, to the specific slave optical connectable CCTV camera apparatus 24 that has generated the interrupt. Only the specific slave optical connectable CCTV camera apparatus 24 that has received the data transmission permission may be allowed to output video data as an upstream optical signal.

The master control server 21 may perform control so that other slave optical connectable CCTV camera apparatuses do not output an outgoing video optical signal while the specific slave optical connectable CCTV camera apparatus 24 is outputting an outgoing video optical signal and an upstream optical signal is being generated in the upstream optical cable 23. For example, since a downstream optical signal is transferred to all the slave optical connectable CCTV camera apparatuses 24 in common, devices, other than the specific slave optical connectable CCTV camera apparatus 24 that has received the data transmission permission, stop outputting their own optical signals.

If the master control server 21 does not send an ACK signal due to the collision of the received upstream optical signal, the slave optical connectable CCTV camera apparatus 24 must resend an optical signal when an ACK signal has not been received within a predetermined period of time. In this case, since the transmission speed of optical communication is very fast, the resending does not greatly affect overall transmission speed.

In accordance with at least some embodiments of the present invention, there are provided an optical connectable CCTV camera apparatus using passive optical devices and a CCTV system, which implement an optical communication relay function using only an optical splitter and an optical combiner, thereby implementing an optical connectable CCTV camera apparatus and a CCTV system that have simple structures and are inexpensive.

In accordance with at least some embodiments of the present invention, there are provided an optical connectable CCTV camera apparatus using passive optical devices and a CCTV system, which can use an optical input device or an optical output device instead of an optical in/out device, so as to implement an optical connectable CCTV camera apparatus and a CCTV system that are inexpensive.

In accordance with at least some embodiments of the present invention, there are provided an optical connectable CCTV camera apparatus using passive optical devices and a CCTV system, which require only cabling to another nearest optical connectable CCTV camera apparatus, thereby implementing an optical connectable CCTV camera apparatus and a CCTV system that can decrease the number and length of cables, can simplify cabling jobs, and can further simplify initial installation, maintenance and expansion, and improvement.

The above embodiments and the accompanying drawings are intended merely to clearly illustrate part of the technical spirit of the present invention, and it will be apparent to those skilled in the art that modifications and specific embodiments that those skilled in the art can easily derive from the present specification and the accompanying drawings are all included in the range of the rights of the present invention.

What is claimed is:

1. An optical connectable CCTV camera apparatus, comprising:
    an optical splitter configured to split an optically received downstream optical signal into a branch optical signal and a pass-through optical signal;
    an optical combiner configured to optically combine an outgoing video optical signal, generated by the optical connectable CCTV camera apparatus, and an upstream optical signal, optically received via another optical connectable CCTV camera apparatus, into a combined upstream optical signal;
    an optical reception unit configured to receive the branch optical signal, to convert the branch optical signal into an incoming electric signal, and to transfer the incoming electric signal to a communication control unit;
    an optical transmission unit configured to receive the outgoing video electric signal from the communication control unit, and to convert the outgoing video electric signal into the outgoing video optical signal;
    the communication control unit configured to extract an address from the incoming electric signal, to output a control command or data, extracted from the incoming electric signal, to a camera function control unit depending on the address, or to discard the incoming electric signal depending on the address, to generate the outgoing video electric signal based on video data transferred from an image processing unit, and to output the generated outgoing video electric signal to the optical transmission unit in accordance with a transmission permission-related control command of the control command;
    the camera function control unit configured to control a lens, an image sensor device, storage, and image processing and encoding functions in accordance with a control command transferred from the communication control unit; and
    the image processing unit configured to, under the control of the camera function control unit, generate video data from video acquired by the image sensor device and transfer the video data to the communication control unit.

2. The optical connectable CCTV camera apparatus of claim 1, wherein the optical splitter comprises:
    a downstream optical signal waveguide configured to receive the downstream optical signal;
    a splitting unit configured to optically split the downstream optical signal, guided via the downstream optical signal waveguide to the splitting unit, into the branch optical signal and the pass-through optical signal;
    a branch optical signal waveguide configured to output the branch optical signal to the optical reception unit; and
    a pass-through optical signal waveguide configured to output the pass-through optical signal.

3. The optical connectable CCTV camera apparatus of claim 1, wherein the optical combiner comprises:
    an upstream optical signal waveguide configured to receive an upstream optical signal transferred via another optical connectable CCTV camera apparatus;
    an outgoing optical signal waveguide configured to receive the outgoing video optical signal from the optical transmission unit;
    a combination unit configured to optically combine the upstream optical signal, applied to the upstream optical signal waveguide, and the outgoing video optical signal into a combined upstream optical signal; and
    a combined optical signal waveguide configured to output the combined upstream optical signal.

4. The optical connectable CCTV camera apparatus of claim 1, wherein the optical splitter or the optical combiner is implemented as a Planar Lightwave Circuit (PLC)- or Fused Biconic Taper (FBT)-based passive optical device.

5. The optical connectable CCTV camera apparatus of claim 4, wherein the optical splitter or the optical combiner is implemented as a Y-shaped waveguide or a directional coupling combiner.

6. The optical connectable CCTV camera apparatus of claim 1, wherein:
    the downstream optical signal is generated by at least one master device, and is applied to the optical splitter of a corresponding optical connectable CCTV camera apparatus directly or via an optical splitter of at least one additional optical connectable CCTV camera apparatus; and
    the combined upstream optical signal is transmitted to at least one master device directly or via an optical combiner of the at least one other additional connectable CCTV camera apparatus.

7. An optical connectable CCTV television system, comprising:
    a master control server configured to operate as a master of a multi-drop network; and slave optical connectable CCTV camera apparatuses connected to the master control server in a multi-drop configuration via a downstream optical cable and an upstream optical cable, wherein each of the slave optical connectable CCTV camera apparatuses comprises:

an optical splitter configured to split a downstream optical signal, optically received via the downstream optical cable, into a branch optical signal and a pass-through optical signal;

an optical combiner configured to optically combine an outgoing optical signal, generated by the slave optical connectable CCTV camera apparatus, and an upstream optical signal, optically received from another slave optical connectable CCTV camera apparatus via the upstream optical cable, into a combined upstream optical signal;

an optical reception unit configured to receive the branch optical signal, to convert the branch optical signal into an incoming electric signal, and to transfer the incoming electric signal to a communication control unit;

an optical transmission unit configured to receive an outgoing video electric signal from the communication control unit, and to convert the outgoing video electric signal into the outgoing optical signal; and the communication control unit configured to extract an address included in the incoming electric signal, to output a control command or data extracted from the incoming electric signal via a local communication interface depending on the address, or to discard the incoming electric signal depending on the address, to generate the outgoing video electric signal based on the video data transferred via the local communication interface, and to output the generated outgoing video electric signal to the optical transmission unit.

8. The optical connectable CCTV television system of claim 7, wherein the master control server and the slave optical connectable CCTV camera apparatuses operate in a time synchronized state in accordance with a time-division method, in which any one of the slave optical connectable CCTV camera apparatuses outputs an upstream optical signal to the master control server via the upstream optical cable in each time span in accordance with a predetermined time-division algorithm.

9. The optical connectable CCTV television system of claim 7, wherein the master control server and the slave optical connectable CCTV camera apparatuses operate in accordance with a polling method, in which the master control server calls a specific slave optical connectable CCTV camera apparatus in accordance with a predetermined polling algorithm and the called specific slave optical connectable CCTV camera apparatus outputs an upstream optical signal to the master control server via the upstream optical cable.

10. The optical connectable CCTV television system of claim 7, wherein the master control server and the slave optical connectable CCTV camera apparatuses operate in accordance with an interrupt method, in which, when a specific slave optical connectable CCTV camera apparatus in which an event has occurred generates an interrupt and optically outputs the generated interrupt to the master control server, the master control server receives an upstream optical signal corresponding to the interrupt, sends a downstream optical signal, including data transmission permission, to the slave optical connectable CCTV camera apparatus that has generated the interrupt, and the specific slave optical connectable CCTV camera apparatus that has received the data transmission permission outputs an upstream optical signal to the master control server via the upstream optical cable.

* * * * *